United States Patent

Fisch et al.

[11] Patent Number: 5,688,901
[45] Date of Patent: Nov. 18, 1997

[54] PARTLY AROMATIC COPOLYAMIDE MOLDING MATERIALS HAVING HIGH CRYSTALLINITY

[75] Inventors: Herbert Fisch, Wachenheim; Gunter Pipper, Bad Dürkheim; Klaus Mühlbach, Grünstadt; Heiner Görrissen, Ludwigshafen, all of Germany

[73] Assignee: BASF Aktiengesellschaft, Ludwigshafen, Germany

[21] Appl. No.: 386,801

[22] Filed: Feb. 6, 1995

[30] Foreign Application Priority Data

Feb. 10, 1994 [DE] Germany ............... 44 04 250.7

[51] Int. Cl.$^6$ ................ C08G 69/08; C08G 73/10
[52] U.S. Cl. ............ 528/310; 528/322; 528/324; 528/331; 528/335; 528/336; 528/338; 528/339; 528/340; 528/349; 528/481; 528/502; 525/432; 524/600; 524/606
[58] Field of Search .................. 528/310, 322, 528/324, 331, 335, 338, 336, 339, 340, 347, 481, 502; 525/432; 524/600, 606

[56] References Cited

U.S. PATENT DOCUMENTS

| | | | |
|---|---|---|---|
| 3,597,400 | 8/1971 | Kashiro et al. | 528/340 |
| 4,607,073 | 8/1986 | Sakashita et al. | 524/464 |
| 5,081,222 | 1/1992 | Reimann et al. | 528/324 |
| 5,166,237 | 11/1992 | Abe et al. | 524/114 |
| 5,324,816 | 6/1994 | Khanna et al. | 528/481 |
| 5,359,013 | 10/1994 | Mason et al. | 525/432 |

FOREIGN PATENT DOCUMENTS

| | | |
|---|---|---|
| 041 130 | 12/1981 | European Pat. Off. . |
| 053 876 | 6/1982 | European Pat. Off. . |
| 070 001 | 1/1983 | European Pat. Off. . |
| 121 984 | 10/1984 | European Pat. Off. . |
| 217 960 | 4/1987 | European Pat. Off. . |
| 271 308 | 6/1988 | European Pat. Off. . |
| 299 444 | 1/1989 | European Pat. Off. . |
| 291 096 | 10/1991 | European Pat. Off. . |
| 505 162 | 9/1992 | European Pat. Off. . |
| 345 486 | 1/1993 | European Pat. Off. . |
| 1 933 595 | 1/1971 | Germany . |
| 23 48 750 | 4/1975 | Germany . |

OTHER PUBLICATIONS

Textile Research Journal, vol. 51, Jan. to Dec. '81, Chapman et al.—Relationships Between Chemical Structure and Properties of . . . .

*Primary Examiner*—Samuel A. Acquah
*Assistant Examiner*—P. Hampton-Hightower
*Attorney, Agent, or Firm*—Keil & Weinkauf

[57] ABSTRACT

Partly aromatic semicrystalline thermoplastic polyamide molding compositions contain A) from 40 to 100% by weight of a copolyamide composed of $a_1$) from 30 to 44 mol % of units which are derived from terephthalic acid, $a_2$) from 6 to 20 mol % of units which are derived from isophthalic acid, $a_3$) from 43 to 49.5 mol % of units which are derived from hexamethylenediamine and $a_4$) from 0.5 to 7 mol % of units which are derived from aliphatic cyclic diamines of 6 to 30 carbon atoms, the molar percentages of components $a_1$) to $a_4$) together giving 100%, and B) from 0 to 50% by weight of a fibrous or particulate filler, C) from 0 to 30% by weight of an elastomeric polymer and D) from 0 to 30% by weight of conventional additives and processing assistants, the percentages by weight of components A) to D) together giving 100%.

6 Claims, No Drawings

PARTLY AROMATIC COPOLYAMIDE MOLDING MATERIALS HAVING HIGH CRYSTALLINITY

BACKGROUND OF THE INVENTION

The present invention relates to partly aromatic semicrystalline thermoplastic polyamide molding compositions, containing A) from 40 to 100% by weight of a copolyamide composed of
  $a_1$) from 30 to 44 mol % of units which are derived from terephthalic acid,
  $a_2$) from 6 to 20 mol % of units which are derived from isophthalic acid,
  $a_3$) from 43 to 49.5 mol % of units which are derived from hexamethylenediamine and
  $a_4$) from 0.5 to 7 mol % of units which are derived from aliphatic cyclic diamines of 6 to 30 carbon atoms,
the molar percentages of components $a_1$) to $a_4$) together giving 100%, and B) from 0 to 50% by weight of a fibrous or particulate filler, C) from 0 to 30% by weight of an elastomeric polymer and D) from 0 to 30% by weight of conventional additives and processing assistants,
the percentages by weight of components A) to D) together giving 100%.

The present invention furthermore relates to the use of these molding compositions for the production of fibers, films and moldings, and to the moldings obtainable from the novel molding materials.

Transparent, amorphous polyamides obtained from bis(4-aminocyclohexyl)methane, terephthalic acid/isophthalic acid and hexamethylenediamine are disclosed in DE-A 19 33 395.

EP-A 345 486 and EP-A 271 308 disclose amorphous polyamides obtained from hexamethylenediamine/bis(4-amino-3-alkylcyclohexyl)alkanes with terephthalic acid/isophthalic acid.

DE-A 23 43 694 and DE-A 23 48 750 disclose filler-containing amorphous polyamides comprising the abovementioned units.

Blend compositions of such amorphous polyamides with aliphatic polyamides are disclosed in EP-A 70 001.

According to the publications, the known copolyamides are amorphous, i.e. they are transparent and exhibit only very low crystallinity.

Although this is advantageous for applications where resistance to chemicals or transparency of the moldings is required, amorphous polyamides have disadvantages in applications, for example in the engine compartment, which require permanent stability at high ambient temperature. Partly aromatic copolyamides comprising terephthalic acid/isophthalic acid units with other different components are disclosed in, inter alia, EP-A 121 984, EP-A 291 096, U.S. Pat. No. 4,607,073, EP-A 217 960 and EP-A 299 444.

Although large amounts of hexamethylenediamine/terephthalic acid improve the crystallinity and significantly increase the glass transition temperature, the processability (temperatures generally above 320° C., and 350° C. for filler-containing polyamides) and the production of such polyamides deteriorate with increasing content of these units (cf. R. D. Chapman et al., Textile Research Journal 1981, page 564).

SUMMARY OF THE INVENTION

It is an object of the present invention to provide semicrystalline partly aromatic copolyamide molding compositions which have high crystallinity and a high glass transition temperature in combination with sufficiently high melting points, so that the copolyamides are more readily processable. At the same time, the copolyamides should possess better mechanical properties (in particular multiaxial impact strength) and surface quality of fiber-reinforced moldings.

We have found that this object is achieved by the molding materials defined at the outset.

DESCRIPTION OF THE PREFERRED EMBODIMENTS

Preferred embodiments are described in the subclaims.

The novel partly aromatic semicrystalline thermoplastic polyamide molding compositions contain, as component A), from 40 to 100, preferably from 50 to 100, in particular from 70 to 100%, by weight of a copolyamide composed of
  $a_1$) from 30 to 44, preferably from 32 to 40, in particular from 32 to 38, mol % of units which are derived from terephthalic acid,
  $a_2$) from 6 to 20, preferably from 10 to 18, in particular from 12 to 18, mol % of units which are derived from isophthalic acid,
  $a_3$) from 43 to 49.5, preferably from 46 to 48.5, in particular from 46.3 to 48.2, mol % of units which are derived from hexamethylenediamine and
  $a_4$) from 0.5 to 7, preferably from 1.5 to 4, in particular from 1.8 to 3.7, mol % of units which are derived from aliphatic cyclic diamines of 6 to 30, preferably 13 to 29, in particular 13 to 17, carbon atoms,
the molar percentages of components $a_1$) to $a_4$) together giving 100%.

The diamine units $a_3$) and $a_4$) are reacted with the dicarboxylic acid units $a_1$) and $a_2$) preferably in equimolar amounts.

Suitable monomers $a_4$) are preferably cyclic diamines of the formula

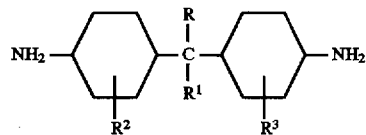

where $R^1$, $R^2$ and $R^3$ are each hydrogen or $C_1$–$C_4$-alkyl.

Particularly preferred diamines $a_4$) are bis(4-aminocyclohexyl)methane, bis(4-amino-3-methylcyclohexyl)methane, bis(4-aminocyclohexyl)-2,2-propane and bis(4-amino-3-methylcyclohexyl)-2,2-propane.

Examples of further monomers $a_4$) are 1,3- and 1,4-cyclohexanediamine and isophoronediamine.

In addition to the units $a_1$) to $a_4$) described above, the partly aromatic copolyamides A) may contain up to 4, preferably up to 3.5%, by weight, based on A), of further polyamide-forming monomers $a_5$), such as those known from other polyamides.

Aromatic dicarboxylic acids $a_5$) have 8 to 16 carbon atoms. Suitable aromatic dicarboxylic acids are, for example, substituted terephthalic and isophthalic acids, such as 3-tert-butylisophthalic acid, polynuclear dicarboxylic acids, e.g. 4,4'- and 3,3'-biphenyldicarboxylic acid, 4,4'- and 3,3'-diphenylmethanedicarboxylic acid, 4,4'- and 3,3'-dicarboxydiphenyl sulfone, 1,4- and 2,6-naphthalenedicarboxylic acid and phenoxyterephthalic acid.

Further polyamide-forming monomers $a_5$) may be derived from dicarboxylic acids of 4 to 16 carbon atoms and aliphatic diamines of 4 to 16 carbon atoms and from aminocarboxylic acids or corresponding lactams of 7 to 12 carbon atoms. Some suitable monomers of these types are suberic acid, azelaic acid and sebacic acid, as typical aliphatic dicarboxylic acids, 1,4-butanediamine, 1,5-pentanediamine and piperazine, as typical diamines, and caprolactam, capryllactam, enantholactam, ω-aminoundecanoic acid and laurolactam, as typical lactams and aminocarboxylic acids.

Partly aromatic copolyamides whose triamine content is less than 0.5, preferably less than 0.3%, by weight, have also proven particularly advantageous.

Partly aromatic copolyamides prepared by most known processes (cf. U.S. Pat. No. 4,603,166) have triamine contents of more than 0.5% by weight, which leads to a deterioration in the product quality and to problems in the continuous preparation. A particular example of a triamine which causes these problems is dihexamethylenetriamine, which forms from the hexamethylenediamine used in the preparation.

While exhibiting the same solution viscosity, copolyamides having a low triamine content have lower melt viscosities compared with products of the same composition which have a higher triamine content. This considerably improves both the processability and the product properties.

The melting points of the partly aromatic copolyamides are from 290° to 340° C., preferably from 292° to 330° C., this melting point being associated with a high glass transition temperature of, as a rule, more than 120° C., in particular more than 130° C. (in the dry state).

According to the invention, the partly aromatic copolyamides are to be understood as meaning those which have a crystallinity of >30%, preferably >35%, in particular >40%.

The crystallinity is a measure of the proportion of crystalline fragments in the copolyamide and is determined by X-ray diffraction or indirectly by measurement of $\Delta H_{cryst}$.

Mixtures of the partly aromatic copolyamides can of course also be reacted, any ratio of the components of the mixture being possible.

Suitable processes for the preparation of the novel copolyamides are known to a person skilled in the art.

An example of a preferred preparation method is the batch process (batchwise preparation method). Here, the aqueous monomer solution is heated in an autoclave to 280°–340° C. in the course of from 0.5 to 3 hours, a pressure of 10–50, in particular 15–40, bar being reached and being kept as constant as possible for up to 2 hours by releasing excess steam. The pressure in the autoclave is then let down at constant temperature in the course of 0.5–2 hours until a final pressure of from 1 to 5 bar has been reached. The polymer melt is then discharged, cooled and granulated.

Another preferred process is carried out similarly to the processes described in EP-A 129195 and 129 196.

In these processes, an aqueous solution of the monomers $a_1$) to $a_4$) and, if required, as), having a monomer content of from 30 to 70, preferably from 40 to 65, by weight, is heated to 280°–330° C. in the course of less than 60 seconds under superatmospheric pressure (from 1 to 10 bar) and with simultaneous evaporation of water and formation of a prepolymer, prepolymers and steam are then separated continuously, the steam is rectified and the entrained diamines are recycled. Finally, the prepolymer is passed into a polycondensation zone and subjected to polycondensation under a superatmospheric pressure of from 1 to 10 bar and at from 280° to 330° C. in a residence time of 5–30 minutes. The temperature in the reactor is of course above the melting point of the resulting prepolymer which is required at the particular water vapor pressure.

As a result of these short residence times, the formation of triamines is substantially prevented.

The resulting polyamide prepolymer, which as a rule has a viscosity number of from 40 to 70, preferably from 40 to 60, ml/g, measured in a 0.5% strength by weight solution in 96% strength sulfuric acid at 25° C., is removed continuously from the condensation zone.

In a preferred procedure, the polyamide prepolymer thus obtained is passed in molten form through a discharge zone with simultaneous removal of the residual water present in the melt. Suitable discharge zones are, for example, devolatilization extruders. The melt freed from the water in this manner is then extruded and the extrudate is granulated.

In a particularly preferred embodiment, it is also possible to add components B) and, if required, C) and/or D) to the prepolymer of component A) in the devolatilization extruder itself, in which case the devolatilization extruder is usually equipped with suitable mixing elements, such as heading blocks. In this case, too, extrusion, cooling and granulation are subsequently carried out.

These granules are subjected to continuous or batchwise solid-phase condensation under inert gas at below the melting point, for example from 170° to 240° C., until the desired viscosity is reached. For example, tumbling driers may be used for the batchwise solid-phase condensation, and the continuous solid-phase condensation may be carried out using heated tubes through which hot inert gas flows. The continuous solid-phase condensation is preferred, the inert gas used being nitrogen or, in particular, superheated steam, advantageously the steam obtained at the top of the column.

The viscosity number, measured in a 0.5% strength by weight solution in 96% strength sulfuric acid at 25° C., is in general from 100 to 500, preferably from 110 to 200, ml/g after the solid-phase postcondensation or the other above-mentioned preparation processes.

The novel copolyamides may contain, as a further component, from 0 to 50, preferably up to 35, in particular from 15 to 35%, by weight of a fibrous or particulate filler (component (B)) or a mixture thereof.

Preferred fibrous reinforcing substances are carbon fibers, potassium titanate whiskers, Aramid fibers and particularly preferably glass fibers. When glass fibers are used, they may be provided with a size and an adhesion promoter in order to improve the compatibility with the thermoplastic polyamide (A). In general, the glass fibers used have a diameter of from 6 to 20 μm.

These glass fibers may be incorporated in the form of both short glass fibers and rovings. In the prepared injection molding, the average length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates, such as wollastonite.

Preferred combinations of fillers are, for example, 20% by weight of glass fibers with 15% by weight of wollastonite and 15% by weight of glass fibers with 15% by weight of wollastonite.

The novel thermoplastic molding materials may contain, as component (C), from 0 to 30, preferably up to 20, in particular from 10 to 15%, by weight of an elastomeric polymer (often also referred to as impact modifier or rubber). Preferred elastomeric polymers are polymers based on olefins, which are composed of the following components:

$C_1$) from 40 to 100% by weight of at least one α-olefin of 2 to 8 carbon atoms, $C_2$) from 0 to 50% by weight of a diene, $C_3$) from 0 to 45% by weight of a $C_1$–$C_{12}$-alkyl ester of acrylic acid or methacrylic acid or a mixture of such esters, $C_4$) from 0 to 40% by weight of an ethylenically unsaturated mono- or dicarboxylic acid or a functional derivative of such an acid, $C_5$) from 0 to 40% by weight of an epoxy-containing monomer and $C_6$) from 0 to 5% by weight of other monomers capable of free radical polymerization, with the proviso that component (C) is not an olefin homopolymer.

A first preferred group comprises the ethylene/propylene (EPM) and ethylene/propylene/diene (EPDM) rubbers, which preferably have a ratio of ethylene to propylene units of from 40:60 to 90:10.

The Mooney viscosities (ML1+4/100° C.) of such, preferably uncrosslinked, EPM and EPDM rubbers (gel contents generally less than 1% by weight) are preferably from 25 to 100, in particular from 35 to 90 (measured using the large rotor after a running time of 4 minutes at 100° C., according to DIN 53 523).

EPM rubbers generally have virtually no more double bonds, whereas EPDM rubbers may have from 1 to 20 double bonds per 100 carbon atoms.

Examples of diene monomers $C_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo-[5.2.1.0.2.6]-3,8-decadiene, or mixtures thereof. Hexa-1,5-diene, 5-ethylidenenorbornene and dicyclopentadiene are preferred. The diene content of the EPDM rubbers is preferably from 0.5 to 50, in particular from 2 to 20, particularly preferably from 3 to 15%, by weight, based on the total weight of the olefin polymer.

EPM and EPDM rubbers may preferably also be grafted with reactive carboxylic acids or derivatives thereof. Particular examples of these are acrylic acid, methacrylic acid and derivatives thereof, as well as maleic anhydride.

A further group of preferred olefin polymers comprises copolymers of α-olefins of 2 to 8 carbon atoms, in particular of ethylene, with $C_1$–$C_{18}$-alkyl esters of acrylic acid and/or methacrylic acid.

In principle, all primary and secondary $C_1$–$C_{18}$-alkyl esters of acrylic acid or methacrylic acid are suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of the methacrylates and acrylates $C_3$) is 0–60, preferably 10–50, in particular 30–45%, by weight, based on the olefin polymers.

Instead of the esters $C_3$), or in addition to these, the olefin polymers may also contain, as monomers, ethylenically unsaturated mono- or dicarboxylic acids $C_4$), which monomers contain acid functional groups and/or latent acid functional groups, or epoxy-containing monomers $C_5$).

Examples of monomers $C_4$) are acrylic acid, methacrylic acid, tertiary alkyl esters of these acids, in particular tert-butyl acrylate, and dicarboxylic acids, such as maleic acid and fumaric acid, or derivatives of these acids and monoesters thereof.

Monomers containing latent acid functional groups are to be understood as compounds which form free acid groups under the polymerization conditions or during incorporation of the olefin polymers into the molding materials. Examples of these are anhydrides of dicarboxylic acids of up to 20 carbon atoms, in particular maleic anhydride, and tertiary $C_1$–$C_{12}$-alkyl esters of the abovementioned acids, in particular tert-butyl acrylate and tert-butyl methacrylate.

The monomers containing acid functional groups or latent acid functional groups and the epoxy-containing monomers are preferably incorporated into the olefin polymers by adding to the monomer mixture compounds of the general formulae I–IV

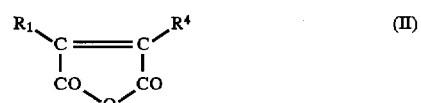

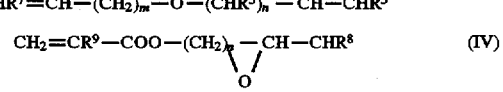

where $R^1$ to $R^9$ are each hydrogen or alkyl of 1 to 6 carbon atoms, m is an integer from 0 to 20 and n is an integer from 0 to 10.

$R^1$ to $R^7$ are each preferably hydrogen, m is preferably 0 or 1 and n is preferably 1. The corresponding compounds are maleic acid, fumaric acid and maleic anhydride $C_4$), and alkenyl glycidyl ether and vinyl glycidyl ether $C_5$).

Preferred compounds of the formulae I, II, III and IV are maleic acid and maleic anhydride as component $C_4$) and epoxy-containing esters of acrylic acid and/or methacrylic acid, particularly preferably glycidyl acrylate and glycidyl methacrylate, as component $C_5$).

The amount of components $C_4$) and $C_5$) is in each case from 0.07 to 40, in particular from 0.1 to 9.0, particularly preferably from 0.5 to 15%, by weight, based on the total weight of the olefin polymers.

Olefin polymers of from 50 to 98.9, in particular from 60 to 95%, by weight of ethylene, from 0.1 to 20, in particular from 0.15 to 15%, by weight of glycidyl acrylate and/or glycidyl methacrylate, acrylic acid and/or maleic anhydride and from 1 to 45, in particular from 10 to 35%, by weight of n-butyl acrylate and/or 2-ethylhexyl acrylate, are particularly preferred.

Further preferred esters of acrylic and/or methacrylic acid are the methyl, ethyl, propyl and isobutyl esters.

Examples of suitable other monomers $C_6$) are vinyl esters and vinyl ethers.

The preparation of the ethylene copolymers described above can be carried out by processes known per se, preferably by random copolymerization under superatmospheric pressure and at elevated temperatures.

The melt flow index of the ethylene copolymers is in general from 1 to 80 g/10 min (measured at 190° C. and under a load of 2.16 kg).

In addition to the above preferred elastomeric polymers based on olefins, for example, emulsion polymers whose preparation is described, for example, in Houben-Weyl, Methoden der organischen Chemie, Volume XII. I (1961), and by Blackley in the monograph Emulsion Polymerisation are suitable as elastomers (C).

In principle, random elastomers or those having a shell structure may be used. Shell-like structure is determined by the order of addition of the individual monomers.

Examples of monomers for the preparation of the elastomers are acrylates, such as n-butyl acrylate and 2-ethylhexyl acrylate, corresponding methacrylates and mixtures thereof. These monomers may be copolymerized with further monomers, such as styrene, acrylonitrile, vinyl ethers and further acrylates or methacrylates, such as methyl methacrylate, methyl acrylate, ethyl acrylate and propyl acrylate.

It is advantageous to use emulsion polymers which have reactive groups at the surface. Such groups are, for example, epoxy, carboxyl, latent carboxyl, amino or amide groups.

The graft monomers described in EP-A 208 187 are also suitable for introducing reactive groups at the surface.

The emulsion polymers may furthermore be completely or partially crosslinked. Examples of monomers having a crosslinking effect are buta-1,3-diene, divinylbenzene, diallyl phthalate and dihydrodicyclopentadienyl acrylate, as well as the compounds described in EP-A 50 265.

It is also possible to use graft-linking monomers, i.e. monomers having two or more polymerizable double bonds which react at different rates in the polymerization.

Examples of such graft-linking monomers are allyl-containing monomers, in particular allyl esters of ethylenically unsaturated carboxylic acids, such as allyl acrylate, allyl methacrylate, diallyl maleate, diallyl fumarate or diallyl itaconate, and the corresponding monoallyl compounds of these dicarboxylic acids. There is also a large number of further suitable graft-linking monomers; for further details, reference may be made, for example, to U.S. Pat. No. 4,148,846.

In general, the amount of these crosslinking monomers is up to 5, preferably not more than 3%, by weight, based on component (C).

Examples of preferred emulsion polymers are n-butyl acrylate/(meth)acrylic acid copolymers, n-butyl acrylate/ glycidyl acrylate or n-butyl acrylate/glycidyl methacrylate copolymers and graft polymers having an inner core of n-butyl acrylate and an outer shell of the abovementioned copolymers.

The elastomers (C) described may also be prepared by other conventional processes, for example by suspension polymerization.

In addition to the essential component A) and, if required, B) and C), the novel molding compositions may contain conventional additives and processing assistants D). The amount thereof is in general up to 30, preferably up to 15%, by weight, based on the total weight of components (A) to (D).

Examples of conventional additives are stabilizers and antioxidants, heat stabilizers and UV stabilizers, lubricants and mold release agents, dyes and pigments and plasticizers.

Pigments and dyes are generally present in amounts of up to 4, preferably from 0.5 to 3.5, in particular from 0.5 to 3%, by weight.

The pigments for coloring thermoplastics are generally known (cf. for example R. Gächter and H. Müller, Taschenbuch der Kunststoffadditive, Carl Hanser Verlag, 1983, pages 494 to 510). A first preferred group of pigments comprises white pigments, such as zinc oxide, zinc sulfide, lead white ($2PbCO_3.Pb(OH)_2$), lithopone, antimony white and titanium dioxide. Of the two most commonly used crystalline modifications (rutile and anatase) of titanium dioxide, in particular the rutile form is used for rendering the novel molding materials white.

Black pigments which may be used according to the invention are iron oxide black ($Fe_3O_4$), spinel black ($Cu(Cr,Fe)_2O_4$), manganese black (mixture of manganese dioxide, silica and iron oxide), cobalt black and antimony black and particularly preferably carbon black, which is generally used in the form of furnace black or gas black (in this context, see G. Benzing, Pigmente für Anstrichmittel, Expert-Verlag (1988), page 78 et seq.).

Inorganic colored pigments, such as chromium oxide green, or organic colored pigments, such as azo pigments and phthalocyanines can of course be used according to the invention for obtaining certain shades. Such pigments are generally commercially available.

It may also be advantageous to use the stated pigments or dyes in the form of a mixture, for example carbon black with copper phthalocyanines, since in general dispersing of colorants in thermoplastic is facilitated.

Antioxidants and heat stabilizers which may be added to the thermoplastic compositions according to the invention are, for example, halides of metals of group I of the Periodic Table, for example sodium halides, potassium halides or lithium halides, if necessary in combination with copper(I) halides, for example chlorides, bromides or iodides. The halides, in particular those of copper, may also contain electron-rich $\pi$ ligands. Examples of such complexes are copper halide complexes with, for example, triphenyl phosphine. Zinc fluoride and zinc chloride may also be used. Furthermore, sterically hindered phenols, hydroquinones, substituted members of this group, secondary aromatic amines, if necessary in combination with phosphorus-containing acids or salts thereof, and mixtures of these compounds, preferably in concentrations of up to 1% by weight, based on the weight of the mixture, may be used.

Examples of UV stabilizers are various substituted resorcinols, salicylates, benzotriazoles and benzophenones, which are generally used in amounts of up to 2% by weight.

Lubricants and mold release agents, which as a rule are added in amounts of up to 1% by weight to the thermoplastic material, are stearic acid, stearyl alcohol, alkyl stearates and stearamides, as well as esters of pentaerythritol with long-chain fatty acids. Salts of calcium, of zinc or of aluminum with stearic acid and dialkyl ketones, e.g. distearyl ketone, may also be used.

The additives include stabilizers which prevent the decomposition of the red phosphorus in the presence of moisture and atmospheric oxygen. Examples are compounds of cadmium, of zinc, of aluminum, of tin, of magnesium, of manganese and of titanium. Particularly suitable compounds are, for example, oxides of the stated metals, and carbonates or basic carbonates, hydroxides and salts of organic or inorganic acids, such as acetates or phosphates and hydrogen phosphates.

The only flameproofing agents mentioned here are red phosphorus and the other flameproofing agents known per se for polyamides.

Where components B)–D) are present, the novel thermoplastic molding materials may be prepared by processes known per se, by mixing the starting components in a conventional mixing apparatus, such as an extruder, a Brabender mill or a Banbury mill, and then extruding the mixture. After extrusion, the extrudate is cooled and comminuted.

The novel molding compositions have relatively high heat distortion resistance, good multiaxial impact strength and sufficiently high melting points in conjunction with a high glass transition temperature and high crystallinity. In particular, they can readily be processed by a thermoplastic method and accordingly are suitable for the production of fibers, films and moldings. Fiber-reinforced moldings have a very good surface, so that they are particularly suitable for applications in automotive construction.

Examples 1 and 3

A 60% strength aqueous solution consisting of terephthalic acid, isophthalic acid and hexamethylenediamine or bis(4-amino-3-methylcyclohexyl)methane or bis(4-aminocyclohexyl)methane was conveyed, in the ratio stated in the Table, from a heated storage container at about 80° C. at a rate corresponding to an amount of polyamide of 5 kg/hour, by means of a metering pump, into a tubular evaporator arranged partly horizontally and partly vertically. The evaporator was heated by means of a liquid heating medium which was at 326° C., with vigorous circulation. The evaporator had a length of 3 m, a capacity of 180 ml and a heat-transfer surface area of about 1300 cm$^2$. The residence time in the evaporator was 50 seconds. The mixture of prepolymer and steam emerging from the evaporator was at 310° C. and was separated into steam and melt in a separator. The melt remained in the separator for a further 10 minutes and was then extruded by means of an extruder having a devolatilization zone, solidified in a water bath and then granulated. The separator and the evaporator zone were kept at 5 bar by a pressure-maintaining means which was arranged down-stream of the column. The steam separated off in the separator was fed to a packed column which had about 10 theoretical plates and into which about 1 l of vapor condensate per hour was introduced at the top to produce a reflux. The resulting temperature at the top of the column was 152° C. The steam emerging after the let-down valve was condensed and had a hexamethylenediamine content of less than 0.05% by weight. An aqueous hexamethylenediamine solution which contained 80% by weight, based in each case on the polyamide produced, of hexamethylenediamine was obtained as a bottom product of the column. This solution was added to the starting salt solution again via a pump before the entrance into the evaporator.

After emergence of the polymer melt from the separator, the polyamide had a very pale natural color and a viscosity number of 48 ml/g (measured as a 0.5% strength solution at 25° C. in 96% strength by weight H$_2$SO$_4$, according to DIN 53 246).

The product had roughly equivalent amounts of carboxyl and amino terminal groups.

In the extruder, the melt was then let down to atmospheric pressure and underwent virtually no further condensation during a residence time of less than 1 minute.

The products were then heated in the solid phase in a stationary heating tube (double-walled glass tube which was heated externally with oil to the required temperature and had an internal diameter of 120 mm and length of 1000 mm and through which 120 l/min of super-heated steam flowed)
batchwise at 200° C. until a viscosity number of 112 ml/g was reached. The residence time was from 8 to 18 hours. In the course of this heating, a major part of the extractable residual monomers may also be extracted by the steam.

Example 2

2 kg of a monomer mixture corresponding to Example 1 were initially taken with 700 ml of water in a 5 l laboratory autoclave. The mixture was distributed over 5 glass tubes, each having a capacity of 800 ml. The autoclave was heated at 350° C. for 1 hour, the resulting water vapor pressure being kept constant after reaching 20 bar, by releasing excess water. The temperature and pressure were then kept constant for a further hour. Thereafter, the autoclave was cooled to 330° C. and let down to atmospheric pressure. The heating of the autoclave was switched off, room temperature being reached after about 3 hours.

The glass tubes were removed from the autoclave and their content was coarsely milled. The product obtained was subjected to solid-phase postcondensation at 198° C. under nitrogen until a viscosity number of 115 ml/g was reached, which took 10 hours.

Comparative Examples 1 to 3

3 kg of a monomer mixture which gave the polymers shown in the Table were initially taken with 2500 ml of water in a 10 l laboratory autoclave. The preparation and working up were carried out according to Example 2. The copolyamides had a viscosity number of 114 ml/g after the solid-phase postcondensation under nitrogen at 196° C. (10 hours).

Examples 4 to 6 and Comparative Examples 4 to 6

70% by weight of the copolyamides A), prepared by the above methods of Examples 1 to 3 and Comparative Examples 1 to 3, were compounded with 30% by weight of glass fibers (component B: mean diameter: 10 µm; aminosilanized surface) in a twin-screw extruder at 320° C. in a conventional manner.

The following tests were carried out: The crystallinity (CR) was determined by small-angle X-ray scattering using granular particles of the unreinforced material. As a relative measure of the crystallinity, the specific heat of fusion $\Delta H_{cryst}$ was determined by means of differential scanning calorimetry (DSC 9900 from DuPont) at a heating rate of 20° C./min.

The multiaxial impact strength $W_{50}$ was determined according to DIN 53 443, using standard test specimens.

The glass fiber-reinforced copolyamides were processed at from 320° to 330° C. to give circular disks (diameter 500 mm, thickness 1 mm). The gloss of these disks was determined according to DIN 67 530, standard A.

The results of the measurements and the compositions of the copolyamide molding materials are shown in the Table.

TABLE

|  |  | Example 1 | Example 2 | Example 3 | Comparative Examples 1 | 2 | 3 |
|---|---|---|---|---|---|---|---|
| Hexamethylenediamine | mol % | 48.1 | 48.1 | 44.8 | 46.0 | 49.7 | 42.7 |
|  | % by weight | 39.1 | 39.1 | 35.9 | 36.9 | 40.8 | 33.3 |
| Terephthalic acid | mol % | 32.2 | 32.2 | 37 | 29.6 | 32.2 | 32.2 |
|  | % by weight | 37.5 | 37.5 | 42.4 | 34.0 | 37.8 | 35.9 |

TABLE-continued

| | | | | | | | |
|---|---|---|---|---|---|---|---|
| Isophthalic acid | mol % | 17.8 | 17.8 | 16.3 | 20.5 | 17.8 | 17.8 |
| | % by weight | 20.6 | 20.6 | 18.7 | 23.6 | 20.9 | 20.9 |
| Bis (4-aminocyclo- | mol % | 1.9 | 1.9 | — | 3.9 | 0.3 | 7.3 |
| hexyl) methane | % by weight | 2.8 | 2.8 | — | 5.5 | 0.45 | 10.9 |
| Bis(4-amino-3-methyl- | mol % | — | — | 1.9 | — | — | — |
| cyclohexyl)methane | % by weight | — | — | 3 | — | — | — |
| CR | [%] | 44 | 44 | 43 | 29 | 36 | 31 |
| $\Delta H_{cryst.}$ | [J/g] | 54 | 52 | 51 | 32 | 44 | 38 |
| $W_{50}$ | [J] 23° C. | >100 | >100 | 90 | 32 | 30 | 32 |
| | [J] –40° C. | 65 | 65 | 44 | 24 | 22 | 23 |

| | Example 4 | Example 5 | Example 6 | Comparative Examples | | |
|---|---|---|---|---|---|---|
| | | | | 4 | 5 | 6 |
| Gloss value [%] | 65 | 62 | 57 | 40 | 38 | 41 |

We claim:

1. A partly aromatic semicrystalline thermoplastic polyamide molding composition, consisting essentially of
   A) from 40 to 100% by weight of a copolyamide composed of
      $a_1$) from 30 to 44 mol % of units which are derived from terephthalic acid;
      $a_2$) from 6 to 20 mol % of units which are derived from isophthalic acid;
      $a_3$) from 43 to 49.5 mol % of units which are derived from hexamethylenediamine;
      $a_4$) from 0.5 to 7 mol % of units which are derived from aliphatic cyclic diamines of 6 to 30 carbon atoms; and
      $a_5$) from 0 to 4 mol % of polyamide forming monomer units the molar percentages of components $a_1$) to $a_5$) together giving 100%, and
   B) from 0 to 50% by weight of a fibrous or particulate filler,
   C) from 0 to 30% by weight of an elastomeric polymer and
   D) from 0 to 30% by weight of conventional additives and processing assistants,
   the percentages by weight of components A) to D) together giving 100%.

2. A polyamide molding composition as defined in claim 1, in which the copolyamide A) is comprises
   from 32 to 40 mol % of $a_1$),
   from 10 to 18 mol % of $a_2$),
   from 46 to 48.5 mol % of $a_3$) and
   from 1.5 to 4 mol % of $a_4$).

3. A polyamide molding composition as defined in claim 1, in which the aliphatic cyclic diamine $a_4$) is
   bis(4-aminocyclohexyl)methane or
   bis(4-amino-3-methylcyclohexyl)methane or a mixture thereof.

4. A polyamide molding composition as defined in claim 1, in which the copolyamide A) has a triamine content of less than 0.5% by weight.

5. A polyamide molding composition as defined in claim 1, in which the copolyamide A) has a crystallinity greater than 30%.

6. A molding obtained from a polyamide molding composition as defined in claim 1.

* * * * *